March 25, 1969  C. L. TILLMAN III  3,434,692
BIFACED WEDGED GATE VALVE
Filed Feb. 23, 1967

INVENTOR
CASSIUS L. TILLMAN III

BY Albert J. Kramer
ATTORNEY

March 25, 1969 C. L. TILLMAN III 3,434,692
BIFACED WEDGED GATE VALVE

Filed Feb. 23, 1967

INVENTOR
CASSIUS L. TILLMAN III

BY *Albert J. Kramer*
ATTORNEY

United States Patent Office 3,434,692
Patented Mar. 25, 1969

3,434,692
BIFACED WEDGED GATE VALVE
Cassius L. Tillman III, % Precision Rebuilders, Inc., P.O.
Box 343, Peters Road, Harvey, La. 70058
Filed Feb. 23, 1967, Ser. No. 618,202
Int. Cl. F16k *3/02, 3/12, 3/316*
U.S. Cl. 251—202                              1 Claim

ABSTRACT OF THE DISCLOSURE

A gate type valve in which a two part sliding gate is disposed between two ports in a valve body. Shiftable seal members are disposed between the gate and ports to maintain a correct attitude between the seals and gate. Marginal wedges are provided in the gate ports in cooperation with a camming member to function when the gate is in its closed position for the purpose of maintaining a tight closure.

---

This invention relates to valves and it is more particularly concerned with valves of the gate type.

An object of the invention is the provision of a gate type valve which permits, when open, a completely enclosed conduit for fluid to flow through uninterruptedly and when closed, to stop the flow of the fluid completely and absolutely notwithstanding variations in fluid pressures and other irregularities.

Another object is the provision of a gate valve operable through a rotatable valve stem and which is relatively free to be rotated even under conditions of high pressure fluid in the valve.

A further object is the provision of such a valve which may be used for isolation purposes, e.g., where the gate has one fluid on one side and another fluid on the other side, the body cavity communicating with a drain, thereby permitting inspection to determine if both or either of the gate segments are pressure tight for cases where contamination of the two different fluids is to be avoided.

A still further object is the provision of such a valve through which fluid may flow in either direction, i.e., either end may be the upstream or the downstream side.

A still further object is the provision of means for mounting the gate and guides therefor to prevent misalignment between valve parts under all conditions to which the valve is adapted to be subjected, thereby assuring normal functioning of the valve at all times.

A still further object is the provision of a gate valve in which the gate cannot be jammed in its closed position when the valve is cooled from a hot condition.

These and still further objects, advantages and features of the invention will be apparent from the following description considered together with the accompanying drawing.

Figure 1:
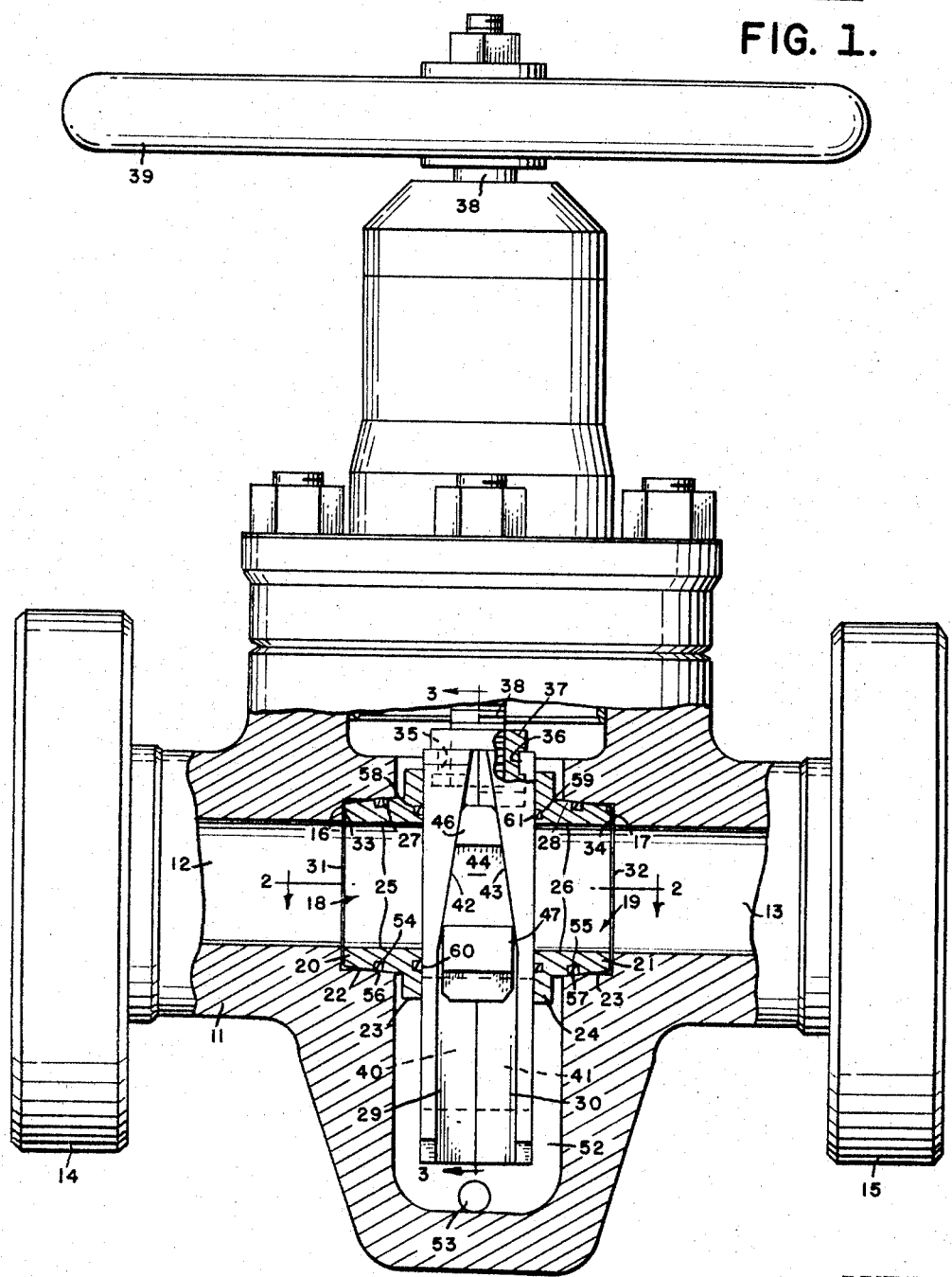
FIG. 1 is a longitudinal elevational view of an embodiment of the invention, partly in section.
Figure 2:
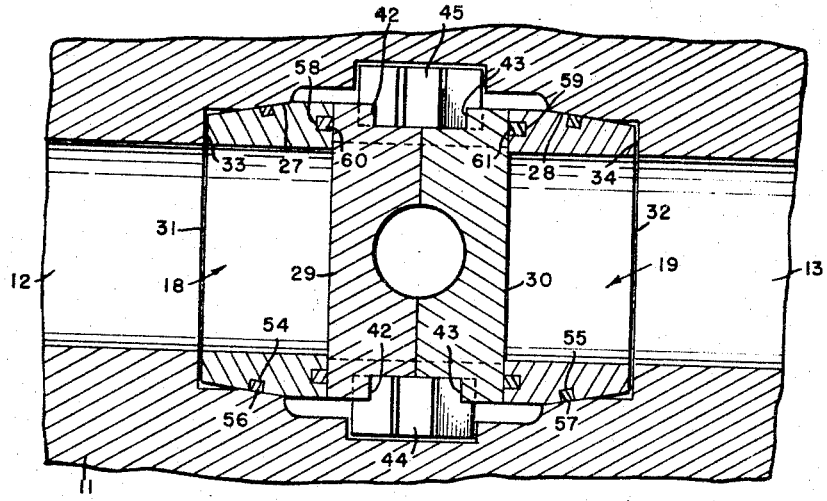
FIG. 2 is a sectional view along the line 2—2 of FIG. 1.
Figures 3, 4:
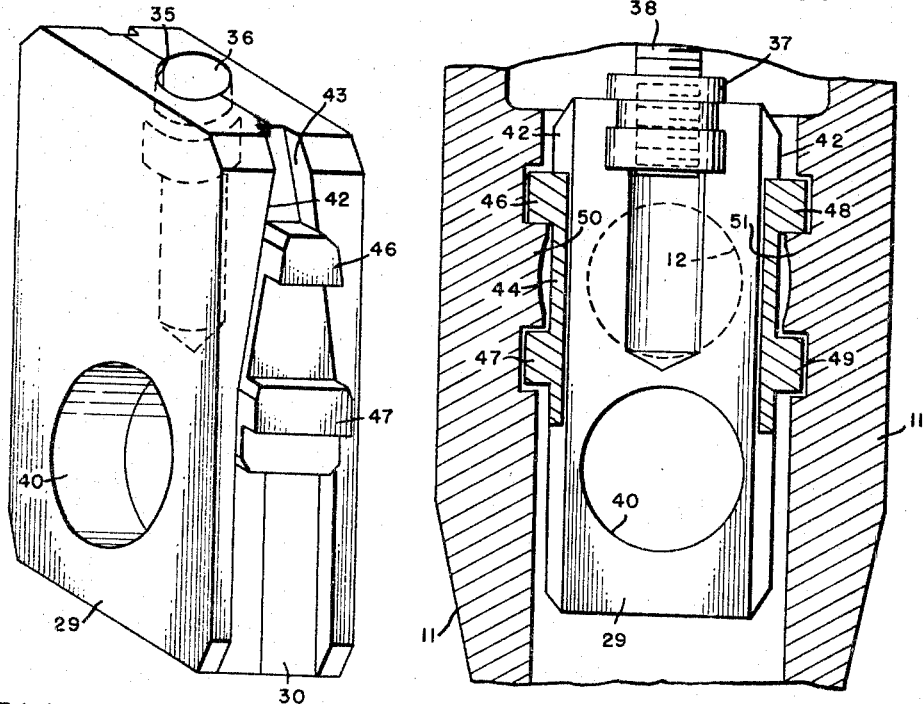
FIG. 3 is a sectional view along the line 3—3 of FIG. 1.
FIG. 4 is a perspective view of the valve gate members and the camming member, apart from the valve as a whole.

Referring with more particularity to the drawing, the embodiment illustrated comprises a valve body 11 having a hallow interior including ports 12 and 13 through which fluid is adapted to flow. At the outer ends of the ports 12 and 13 the valve body is provided with heavy flanges 14 and 15, respectively, for connection to a pipe system (not shown).

The hollow interior extends transversely of the ports 12 and 13, to receive the valve mechanism.

At the inner ends of the ports 12 and 13 the valve body is provided with recesses 16 and 17 adapted to receive shiftable seals 18 and 19. Each seal comprises a cylindrical member 20, 21 having a tapered exterior surface 22, 23 and an inner flange 23, 24. The inner diameters 25, 26 of the seals are precisely the same as that of the ports 12 and 13.

A portion 27, 28 of each recess 16 and 17 is tapered to form a seat for the correspondingly tapered surfaces 22, 23. The taper of the portions 27, 28, however, are slightly greater than the taper of the corresponding surfaces 22, 23. A difference of approximately one degree has been found satisfactory, e.g., 8½" and 9½" tapers respectively. The purpose of this difference in taper is to create an internal stress between the seals and recesses within the elastic limits of the materials used so as to provide a constant force against the gate members hereinafter more fully explained.

The valve body is made of a conventional material while the seals 18, 19 are made of high strength steel. Alternatively, a soft resilient nonmetallic material may be used in conjunction with the basic steel material of the seals. For example, the seals may be made of steel coated with different types of pressure flowable materials, such as silver, lead, zinc, cadmium, copper, etc. or with a common commercial material, such as Teflon, Hycar, rubber or other such materials. However, the use of such surface materials is not indispensable to a complete achievement of the objectives of the invention.

Between the flanges 23 and 24 of the seals, there is disposed a two part gate. The two parts 29 and 30 are symmetrical and together are slidably disposed between the flanges 23 and 24 of the seals under stresses allowed by the yielding of the seals against the abutment surfaces 22, 23. This stress is limited to a degree within the elastic limit of the materials by the abutment of the outer ends 31 and 32 of the seals against the shoulders 33 and 34 formed by the recesses 16 and 17, the lengths of the seals being selected for this particular purpose. However, other means of diameter interference may be used to accomplish the same purpose.

The upper ends of the gates are provided with semicircular hollow portions 35, 36 adapted to receive a drive bushing 37. The bushing 37 is threadedly engaged with a drive shaft 38, the upper end of the drive shaft being journaled by conventional means in the valve body and extending outwardly to the exterior of the valve body where it is provided with a hand wheel 39 for manual rotation thereof.

The lower ends of the gates are provided with openings 40, 41 of precisely the same diameter as the inner diameters 25, 26 of the seals 18, 19 and the parts 12 and 13. These openings 40, 41 are adapted to align in the uppermost positions of the gate members with the ports 12 and 13 to provide flowthrough when it is desired to open the valve. Movement of the gates to their lowermost positions provides an imperforate barrier to the flow of fluid between the ports 12 and 13.

In the lowermost position of the valves outer wedge shape marginal edges 42, 42 and 43, 43 are provided in abutting relation to side cams 44, 45. These side cams have each outwardly projecting lips 46, 47 and 48, 49 adapted to straddle bosses 50 and 51 respectively, integrally formed on the interior of the valve body with a degree of looseness that permits a slight amount of tilting of the cams.

By means of these wedging cams a tight valve closure is assured. Moreover, due to the lateral yieldableness of the cams 44, 45 and the stress created by the mounting of the seals 18 and 19 in their recesses 16 and 17, irregularities are readily compensated to insure a complete closure on each gate side.

The lower side of the valve body is elongated and it contains a cavity 52 to accommodate the lower parts of the gate in their lowermost positions. At the bottom of the cavity 52 a bleeder duct 53 is provided to withdraw fluid which may become trapped within the cavity. This may be used as a test means to determine when parts become worn to the extent that replacement or repairs are necessary.

The seals are provided with annular grooves 54, 55 at the surfaces adjacent the gates to receive a seal 56, 57 of Teflon, nylon or other soft seal material which may be used as an additional means for insuring a complete seal between the surfaces. An additional annular groove 58, 59 is provided on the inner side of each seal adjacent the gate members for the reception of similar seals 60, 61.

I claim:
1. A valve of the class described comprising a valve body having aligned ports for the flow of fluid therethrough, a valve gate between said ports, said gate comprising two symmetrical coacting members, one for each port, said members having openings therethrough adapted for registration with said ports when the valve is open and having imperforate sections adapted for registration with said ports when the valve is closed, said symmetrical members also having marignal camming surfaces, removable wedges carried by the valve body in abutting relation with said camming surfaces to effect outward pressure of said members against said seals when the valve is in closed position, said wedges having lip projections and said valve body having corresponding bosses for receiving and tiltably supporting said projections, said valve body having recesses at the inner ends of said ports, a shiftable seal member within each said recess between the gate and the valve body, said seal members being disposed in the recesses under pressure within the elastic limit of the materials of which they and the valve body are made, the surfaces of contact between the seal members and the recesses being of unequal taper, said recesses and seal members being spaced in the unstressed condition and abutting in the fully stressed condition to restrain the seal members to yield within the elastic limit of the materials, said seal members having each an opening therethrough corresponding to said ports and having an inner surface bearing against the valve gate.

References Cited

UNITED STATES PATENTS 3,152,786 10/1964 Soderberg _____ 251—167
3,349,789 10/1967 Crain _____ 251—200

CLARENCE R. GORDON, *Primary Examiner.*

U.S. Cl. X.R.

251—327, 328